May 13, 1969  F. A. SETTINO  3,443,922

FLOAT GLASS TAKE-OUT ROLL

Filed March 8, 1966

INVENTOR.
FREDRICK A. SETTINO

BY

*Chisholm and Spencer*

ATTORNEYS

3,443,922
FLOAT GLASS TAKE-OUT ROLL

Frederick A. Settino, New Kensington, Pa., assignor to PPG Industries, Inc., Pittsburgh, Pa., a corporation of Pennsylvania
Filed Mar. 8, 1966, Ser. No. 532,751
Int. Cl. C03b *15/02*
U.S. Cl 65—193                        6 Claims

ABSTRACT OF THE DISCLOSURE

In the float glass process, the take-out rolls are constructed of an alloy containing, by weight, not more than 2 percent iron, at least 10 percent cobalt and at least 3 percent tungsten, to which tin oxide does not adhere.

---

Figure 1:
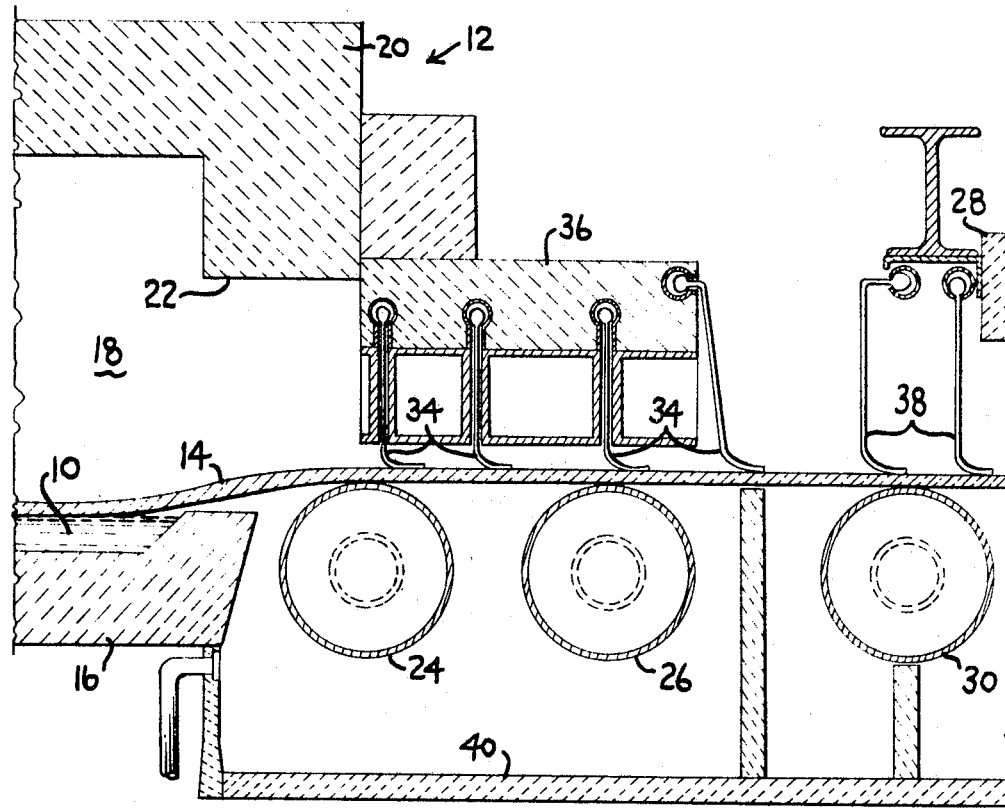

This application relates to the production of float glass, i.e., that process wherein a mass of glass is formed into a ribbon on a bath of molten metal, such as tin or a tin alloy. Specifically, this application relates to the manufacture of improved quality float glass by the use of improved take-out rolls which remove the formed ribbon of glass from the bath and transfer the glass into an annealing lehr.

Glass produced by the float process, as is depicted in Pilkington Patent No. 3,083,551, is said to possess fire-finished surfaces. However, because of the environment in which the process is conducted, the glass frequently is marred by a defect known in the art as "bottom speck." Bottom speck, randomly distributed, is thought to be a powdery deposit of tin oxide on the lower or tin-engaging surface of the glass. It may be localized or may extend over all the glass produced. And, it is visible to the naked eye. The exact cause of bottom speck is not understood, but it is thought to be caused by tin compounds, for example, dross (usually tin oxide) which is carried by the glass as it is removed from the bath of molten tin. Also deposits of tin oxide adhere on the take-out rolls which contact the bottom surface of the glass and damage the bottom surface of the glass and cause a defect known as "bottom marking." Bottom speck and bottom marking are referred herein as "bottom damage."

In the float glass process, precautions are taken to minimize the oxidization of the metal of the bath and thus the formation of dross on its surface. For this purpose, a protective atmosphere is maintained in the headspace over the metal bath and at a pressure slightly above atmospheric. See the Pilkington patent, supra.

Even with the precautions taken some dross is formed on the bath and is transferred to the glass being removed therefrom. To remove the glass from the bath, one or more take-out rolls are located adjacent the cold or exit end of the metal bath. These rolls have, in the past, been constructed of stainless steel such as those containing by weight 20–25 percent chromium, 12–20 percent nickel and the balance iron, and are subject to atmosphere "carry-over" or "string-out," i.e., atmosphere rich in metal vapors from the headspace above the bath. It is thought that the metal oxide in the vapor-rich atmosphere becomes deposited on the rolls as a coating which is neither uniform in thickness or in distribution. When the ribbon of glass, with dross on its lower surface, contacts the coated stainless steel rolls, a transfer of oxide to the glass surface may occur. Additionally, the glass surface is fractured by contact with the roll and its uneven coating. It has been customary to scrape the rolls using carbon blades resiliently urged thereagainst, however, this has not been the solution to the problem because surface damage to the rolls is incurred. The rolls are also chemically attacked by the metal oxide necessitating their removal and replacement at frequent intervals.

It has been found that the problems hereinbefore encountered are eliminated by constructing the take-out rolls of an alloy containing not more than 5.00 percent and preferably 2.00 percent or less by weight of iron and at least 10 percent by weight of cobalt in combination with at least 3 percent by weight of tungsten. It is thought that a hard oxide is formed on the surface of these low iron-containing alloys which surprisingly, rejects deposits of tin from the tin-rich atmosphere. Any dross carried by the glass ribbon does not adhere thereto. This was unexpected because tin oxides are generally tenacious and adhere readily to most metals and metal alloys. The fact there are no deposits on the take-out roll has eliminated the need for cleaning the rolls and the need for carbon or metal scrapers which caused surface damage to the prior rolls. In addition, it has been found that the temperature of the exit end of the bath can be materially increased, i.e., on the order of 20 percent, for example, from about 1000° F. to about 1200° F. This is advantageous in that cold-end breaks are materially reduced, a desirable condition especially at start-up of the operation.

Moreover, higher cold-end (or exit end) temperatures lessens the amount of dross produced by oxidization of the tin of the bath because tin oxidizes rapidly below 1200° F., but at and above 1200° F., tin oxide reduces to tin in the presence of a non-oxidizing atmosphere, as is the case here.

Figure 2:
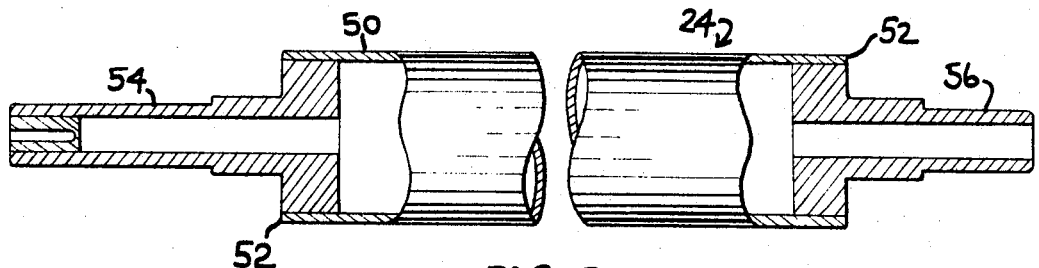

Other advantages will be apparent from the following description, especially with the accompanying drawing, in which FIG. 1 is a partial longitudinal section through the exit or cold end of a float glass-producing apparatus illustrating the disposition of the take-out rolls; and FIG. 2 is an illustration of a take-out roll showing parts broken away to show details of construction.

In FIG. 1 there is shown the exit or cold end of a float glass-producing apparatus which includes a bath 10 of molten tin, contained with a suitable refractory enclosure 12, on which a ribbon of glass 14 is formed. The enclosure 12 includes a receptacle 16 for the bath 10 of tin, side walls 18 and a roof 20. An exit 22 is also provided. The glass ribbon 14, which has been sized and surfaced on the molten tin is removed from the tin by a pair of take-out rolls 24, 26 and is conveyed into an annealing lehr 28 and therethrough by lehr rolls 30. The rolls 24, 26 and 30 are suitably journaled for rotation, and means (not shown) are provided for driving the rolls at the same speed. Such means is conventional and need not be described in detail. As will be noted the glass ribbon 14 is flexed slightly and is lifted over the exit lip 32 of the receptacle 16.

A protective atmosphere is supplied in the headspace above the tin bath within the enclosure 12. This is in accordance with the usual practice for the production of float glass. Generally, the atmosphere is a mixture of nitrogen and hydrogen, for example 95 percent nitrogen and 5 percent hydrogen, and under a pressure slightly above atmospheric to minimize air entrance into the enclosure 16. To maintain the protective atmosphere at the exit end of the enclosure, curtains 34, supported from a roof extension 36, are provided, which curtains drag on the glass being removed from the bath. And to control the atmosphere in the lehr 28, curtains 38 are provided by the entrance thereof. These curtains are usually made of an asbestos-containing material to withstand the temperatures involved, for example, on the order of 1000° F. and above, and are impervious to gases.

Even with the precautions noted above, some oxidation of the tin occurs and dross is formed on the surface of the bath. Some of the dross adheres to the bottom surface of the glass ribbon 14, especially as the glass is lifted from the bath, so that dross carried by the glass contacts the take-out rolls 24 and 26.

Heretofore, as previously explained, oxide from the metal vapor deposited on the take-off rolls 24 and 26 constructed of stainless steel formed a randomly distributed, non-uniform coating thereon. Damage to the lower surface of the glass occurred. The coating was scraped from the rolls and was deposited in a dross box 40 at the exit end of the enclosure 20. The dross box, of course, forms a lower seal for the enclosure.

In accordance with this invention, the take-out rolls 24 and 26 are constructed of an alloy containing not more than 5.00 percent and preferably 2.00 percent or less by weight or iron in combination with at least 10 percent by weight of cobalt and at least 3 percent by weight of tungsten. Suitable alloys are manufactured by the Haynes Stellite Company, Kokomo, Ind., a division of Union Carbide Corporation, A preferred alloy is Haynes Alloy No. 36 having a composition as follows:

| Element: | Percentage by weight |
|---|---|
| Chromium | 17.5–19.5 |
| Tungsten | 14.0–16.0 |
| Iron, (max.) | 2.00 |
| Carbon | 0.35–0.45 |
| Silicon, (max.) | 1.00 |
| Nickel | 9.0–11.0 |
| Manganese, (max.) | 1.50 |
| Boron | 0.01–0.05 |
| Cobalt | balance |

FIG. 2 illustrates a take-out roll 24 of the type manufactured from the above alloy. The tube portion 50 of this roll is centrifugally cast from the alloy and it is welded, as at 50, to trunnions 54, 56, cast from the same material. The roll is then finish ground to final finish and tolerance. The take-out roll 26 is of the same construction and material. Other manufacturing techniques may be used to produce the rolls, such techniques generally being dictated by the properties of the particular alloy being used.

Tin and tin oxides (included in dross) wet or stick to most materials, especially metals. Exceptions to this are materials, such as graphite, or some ceramics, i.e., materials which would not be suitable for roll material. Thus it was to be expected that the tin oxides and dross would adhere to the rolls of the above-mentioned alloy. However, it was found that such was not the case; in fact, the rolls reject dross and deposits of tin oxide, so that cleaning of the rolls and thus the use of scrapers is eliminated. While the reason, or reasons for the non-wetting of the rolls by the tin or tin oxide-containing dross are not fully understood, it is thought that the phenomenon is due to an oxide which forms on the roll-surface, especially in the environment in which the rolls are used, which oxide rejects tin-containing deposits.

In addition to the above, because of the relatively high-melting temperature of the alloy, i.e., on the order of 2535° F. (1389° C.) it has been found that the cold or exit end of the process can be materially raised, such for example from about 1000° F. to about 1200° F. While the glass ribbon is more flexible at this higher temperature, and the bottom surface can be expected to be more easily damaged by mechanical contact, it has been found that bottom surface marking is less than at the lower temperatures. This is thought to be due to several reasons: for example, at about 1000° F. and below, tin oxidizes rapidly, but above this temperature, tin oxide reduces to tin especially in the presence of a reducing atmosphere, so that the quantity of dross available to adhere to the glass is much reduced, and with no deposits on the take-out rolls, hotter glass can be handled without surface damage. Because the glass ribbon is more flexible at the higher temperatures, less cold-end breakage occurs, so that, all in all, a more stable, more continuous process is provided. With reduced cooling of the glass, more bath length can be utilized for leveling and surfacing the glass, so that, in effect, the length of the bath can be reduced or the speed of production can be increased. In any event, there is a cost-saving by reducing manufacturing costs.

While the take-out rolls 24 and 26 have been described as manufactured from a certain, described alloy, it is to be understood that other alloys having low iron contents and including cobalt and tungsten may be used. For example, the following alloys manufactured by Haynes Stellite Company are suitable for the rolls.

Haynes Alloy No. 31

| Element: | Percentage by weight |
|---|---|
| Nickel | 9.5–11.5 |
| Chromium | 24.5–26.5 |
| Manganese (max.) | 1.00 |
| Tungsten | 7.00–8.00 |
| Iron (max.) | 2.00 |
| Carbon | 0.45–0.55 |
| Silicon (max.) | 1.00 |
| Cobalt | Balance |

Haynes Alloy No. R-41

| Element: | Percentage by weight |
|---|---|
| Cobalt | 11.00 |
| Chromium | 19.0 |
| Molybdenum | 10.0 |
| Iron (max.) | 5.0 |
| Carbon | 0.12 |
| Boron | 0.007 |
| Aluminum | 1.5 |
| Tungsten | 3.2 |
| Nickel | Balance |

Haynes Alloy No. 151

| Element: | Percentage by weight |
|---|---|
| Nickel (max.) | 1.00 |
| Chromium | 20.0 |
| Tungsten | 12.5 |
| Iron (max.) | 2.00 |
| Carbon (max.) | 0.47 |
| Boron (max.) | 0.050 |
| Cobalt | Balance |

Because of the configuration of the take-out rolls and their contact with glass, it is necessary that the alloy used be readily machineable. Each of the alloys so listed meets this requirement.

When using take-out rolls constructed of stainless steel, as much as 25 percent of the production of glass was relegated to cullet, i.e., broken into small pieces for use in batch. However, after installing rolls constructed of Haynes Alloy No. 36, as herein described and while operating under the same conditions with the exception of higher cold-end temperatures, the quantity of glass production relegated to cullet is generally less than 5 percent of production and usually about 1 percent of production.

What is claimed is:

1. A take-out roll for a float glass-producing line for use adjacent a bath of molten metal to remove a ribbon of glass therefrom and in a protective atmosphere above said bath, said take-out roll being constructed of an alloy containing, by weight, not more than 2.00 percent iron, at least 10 percent cobalt and at least 3 percent tungsten whereby the deposition of materials produced in said line upon said take-out roll is prevented.

2. A take-out roll as recited in claim 1 constructed of an alloy containing, by weight, approximately 50 percent cobalt.

3. A take-out roll as recited in claim 1 constructed of an alloy containing, by weight,

|  | Percent |
|---|---|
| Chromium | 17.5–19.5 |
| Tungsten | 14.0–16.0 |
| Iron (max.) | 2.00 |
| Carbon | 0.35–0.45 |
| Silicon (max.) | 1.00 |
| Nickel | 9.0–11.0 |
| Manganese (max.) | 1.50 |
| Boron | 0.01–0.05 |
| Cobalt | Balance |

4. A take-out roll as recited in claim 1 constructed of an alloy containing, by weight,

|  | Percent |
|---|---|
| Chromium | 24.5–26.5 |
| Tungsten | 7.00–8.00 |
| Iron (max.) | 2.00 |
| Carbon | 0.45–0.55 |
| Silicon (max.) | 1.00 |
| Nickel | 9.5–11.5 |
| Manganese (max.) | 1.00 |
| Cobalt | Balance |

5. A take-out roll as recited in claim 1 constructed of an alloy containing, by weight,

|  | Percent |
|---|---|
| Chromium | 19.0 |
| Tungsten | 3.2 |
| Iron (max.) | 5.00 |
| Carbon | 0.12 |
| Boron | 0.007 |
| Molybdenum | 10.0 |
| Aluminum | 1.5 |
| Cobalt | 11.0 |
| Nickel | Balance |

6. A take-out roll as recited in claim 1 constructed of an alloy containing, by weight,

|  | Percent |
|---|---|
| Chromium | 20.0 |
| Tungsten | 12.5 |
| Iron (max.) | 2.00 |
| Carbon (max.) | 0.47 |
| Boron (max.) | 0.050 |
| Nickel (max.) | 1.00 |
| Cobalt | Balance |

References Cited

UNITED STATES PATENTS

| 3,205,055 | 9/1965 | Laurent et al. | 65—1 |
| 3,237,441 | 3/1966 | Eberle | 75—209 |
| 3,316,074 | 4/1967 | Laurent et al. | 65—1 |
| 3,317,303 | 5/1967 | Schorr | 65—253 |
| 3,351,450 | 11/1967 | Silverwood | 65—253 |

DONALL H. SYLVESTER, *Primary Examiner.*

JOHN H. HARMAN, *Assistant Examiner.*

U.S. Cl. X.R.

29—132; 65—182, 374; 75—170, 171